(12) United States Patent
Ren

(10) Patent No.: US 11,371,625 B2
(45) Date of Patent: Jun. 28, 2022

(54) FLUID CROSS-FREE SWITCHING VALVE

(71) Applicant: NANJING RUNZE FLUID CONTROL EQUIPMENT CO., LTD, Nanjing (CN)

(72) Inventor: Dapeng Ren, Nanjing (CN)

(73) Assignee: NANJING RUNZE FLUID CONTROL EQUIPMENT CO., LTD, Nanjing (CN)

( * ) Notice: Subject to any disclaimer, the term of this patent is extended or adjusted under 35 U.S.C. 154(b) by 0 days.

(21) Appl. No.: 17/282,000

(22) PCT Filed: Sep. 3, 2020

(86) PCT No.: PCT/CN2020/113169
§ 371 (c)(1),
(2) Date: Apr. 1, 2021

(87) PCT Pub. No.: WO2021/128928
PCT Pub. Date: Jul. 1, 2021

(65) Prior Publication Data
US 2021/0356053 A1    Nov. 18, 2021

(30) Foreign Application Priority Data
Dec. 25, 2019    (CN) .......................... 201911359137.5

(51) Int. Cl.
*F16K 31/04*    (2006.01)
*F16K 11/078*    (2006.01)

(52) U.S. Cl.
CPC .......... *F16K 31/047* (2013.01); *F16K 11/078* (2013.01)

(58) Field of Classification Search
CPC ........... Y10T 137/86533; F16K 11/078; F16K 31/047
See application file for complete search history.

(56) References Cited

U.S. PATENT DOCUMENTS 8,905,075 B2 * 12/2014 Tower ....................... F16K 3/28
137/625.15
9,063,114 B2 * 6/2015 Wiechers .............. F16K 31/041
9,234,608 B2 * 1/2016 Stearns ................. F16K 11/085
(Continued)

FOREIGN PATENT DOCUMENTS

CN    204852471 U    12/2015
CN    110886873 A    3/2020
(Continued)

*Primary Examiner* — Seth W. Mackay-Smith
(74) *Attorney, Agent, or Firm* — Bayramoglu Law Offices LLC

(57) ABSTRACT

A fluid cross-free switching valve includes a valve body, a first drive assembly and a second drive assembly. The valve body includes a valve head, a valve core seat and a rotor valve core. The valve core seat is rotatable relative to the valve head. The rotor valve core is slidably mounted on the valve core seat. The rotor valve core is fitted with the valve head. The valve head is provided with at least three reversing connectors. The rotor valve core is provided with a groove that is in communication with the reversing connector on a fitting surface of the rotor valve core and the valve head. The first drive assembly is able to drive the valve core seat to rotate, and the second drive assembly is able to drive the rotor valve core to slide.

10 Claims, 8 Drawing Sheets

(56) References Cited

U.S. PATENT DOCUMENTS

| | | | | |
|---|---|---|---|---|
| 9,400,265 | B2* | 7/2016 | Wiechers | ............ F16K 11/0743 |
| 2011/0006237 | A1* | 1/2011 | Tower | ................ F16K 11/0743 |
| | | | | 251/304 |

FOREIGN PATENT DOCUMENTS

| | | | |
|---|---|---|---|
| CN | 110925450 | A | 3/2020 |
| CN | 110925474 | A | 3/2020 |
| CN | 211202968 | U | 8/2020 |
| JP | H11153238 | A | 6/1999 |

* cited by examiner

FLUID CROSS-FREE SWITCHING VALVE

CROSS REFERENCE TO THE RELATED APPLICATIONS

This application is the national phase entry of International Application No. PCT/CN2020/113169, filed on Sep. 3, 2020, which is based upon and claims priority to Chinese Patent Application No. 201911359137.5, filed on Dec. 25, 2019, the entire contents of which are incorporated herein by reference.

TECHNICAL FIELD

The present invention relates to the technical field of fluid control device, in particular to a fluid cross-free switching valve.

BACKGROUND

Sample injectors are widely used in many fields such as medical drug analysis, environmental monitoring, inspection and quarantine. In the case of a wide variety of samples or reagents to be analyzed, the reversing valve is typically used to assist the sample injector, but the existing reversing valve often contact the non-target connector in the process of switching connectors, such that the fluid remaining at the non-target connector is more likely to contact the sample to be tested, causing sample contamination and further affecting the accuracy of test analysis.

SUMMARY

Based on this, it is necessary to provide a fluid cross-free switching valve capable of avoiding cross-contamination due to fluids from other inlets when the inlet is switched.

The technical solution adopted by the present invention to solve the technical problem thereof is as follows. A fluid cross-free switching valve includes a valve body, a first drive assembly and a second drive assembly. The valve body includes a valve head, a valve core seat and a rotor valve core. The valve core seat is rotatable relative to the valve head. The rotor valve core is slidably mounted on the valve core seat. The rotor valve core is fitted with the valve head. The valve head is provided with at least three reversing connectors. The rotor valve core is provided with a groove. The groove is communicated with the reversing connector on a fitting plane of the rotor valve core and the valve head. The first drive assembly is configured to drive the valve core seat to rotate, and the second drive assembly is configured to drive the rotor valve core to slide.

Further, the valve core seat is provided with a chute. The rotor valve core is slidably connected to the chute. An end surface of the rotor valve core away from the valve head is provided with a guide groove. A length direction of the guide groove is perpendicular to a length direction of the chute. The valve body further includes an eccentric shaft that is rotatably inserted into the valve core seat. One end of the eccentric shaft is movably accommodated in the guide groove.

Further, the eccentric shaft includes a drive shaft and a connecting strut. The connecting strut is protrudingly provided at an end portion of the drive shaft. A central axis of the connecting strut is staggered from a central axis of the drive shaft. A bearing is mounted on the connecting strut, and the bearing is accommodated in the guide groove.

Further, the length direction of the chute is arranged along a radial direction of the valve core seat. A length direction of the groove is parallel to the length direction of the chute, and the groove is arranged along the radial direction of the valve core seat.

Further, the valve body further includes a rotor wear-resistant member. The rotor wear-resistant member is matched with the chute and mounted in the chute, and the rotor valve core is fitted with the rotor wear-resistant member.

Further, the reversing connectors are evenly distributed along a circumference of the valve head. The center of the valve head is provided with a common connector for inflowing fluid along an axial direction of the valve head, and the common connector is communicated with the groove.

Further, the valve body further includes a valve seat. The valve head is mounted on one end of the valve seat. The valve seat is sleeved outside the valve core seat, and the valve core seat is rotatable relative to the valve seat.

Further, the valve body further includes a plane bearing and an elastic member. The valve core seat is formed with a contact surface. The plane bearing is sleeved outside the valve core seat. The elastic member is telescopically arranged between the plane bearing and the contact surface, and an end surface of the plane bearing contacts an inner wall of one end of the valve seat.

Further, the fluid cross-free switching valve further includes a housing. The valve body is mounted on one end of the housing, and both the first drive assembly and the second drive assembly are mounted in the housing.

Further, the first drive assembly includes a first drive motor and a first deceleration mechanism. The first drive motor is connected to a power input end of the first deceleration mechanism. A power output end of the first deceleration mechanism is connected to the valve core seat. The second drive assembly includes a second drive motor and a second deceleration mechanism. The second drive motor is connected to a power input end of the second deceleration mechanism. The power output end of the second deceleration mechanism is connected to the eccentric shaft after rotatably passing through the first drive assembly.

The present invention has the following advantages. In the fluid cross-free switching valve provided by the present invention, the communication relationship between the groove and the current reversing connector can be disconnected by means of sliding the rotor valve core, the groove bypass other reversing connectors by means of rotating the valve core seat, and then the groove communicates with the target reversing connector by means of sliding the rotor valve core again. In this way, the fluid contamination caused by crossing with other reversing connectors is avoided during the process of switching to the target reversing connector.

BRIEF DESCRIPTION OF THE DRAWINGS

The present invention will be further explained below in conjunction with the drawings and embodiments.

Figure 1:
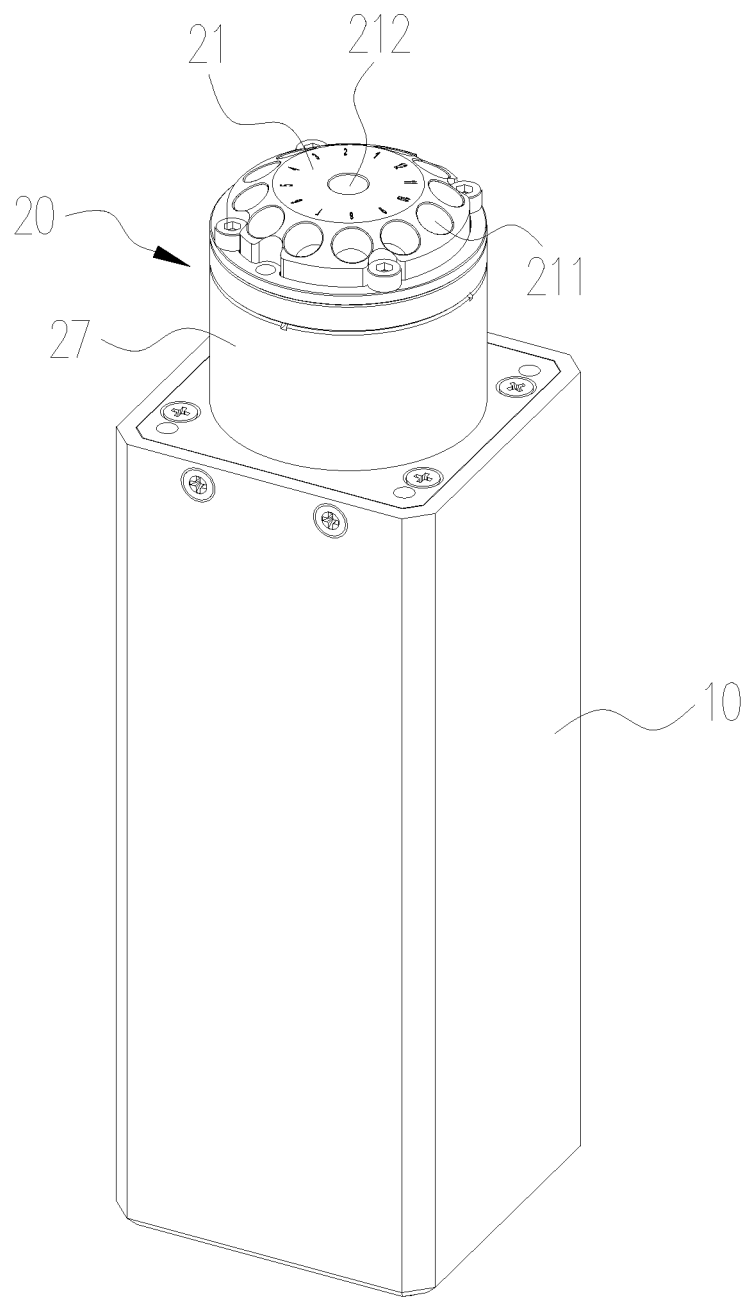
FIG. 1 is a perspective view of a fluid cross-free switching valve of the present invention.

The names and numbers of component parts in the drawings are as follows:

| | | |
|---|---|---|
| housing 10 | valve body 20 | valve head 21 |
| reversing connector 211 | common connector 212 | valve core seat 22 |
| chute 221 | base 222 | connecting rod 223 |
| rotor valve core 23 | groove 231 | guide groove 232 |
| stator 24 | rotor wear-resistant member 25 | drive shaft 26 |
| connecting strut 261 | bearing 262 | valve core bearing 263 |
| valve seat 27 | bolt 271 | seal 272 |
| plane bearing 28 | elastic member 29 | first drive assembly 30 |
| first drive motor 31 | first deceleration mechanism 32 | first gearbox 321 |
| first ring gear 322 | first master planet gear 323 | first master planet carrier 324 |
| first sub-planet gear 325 | first sub-planet carrier 326 | second drive assembly 40 |
| second drive motor 41 | second deceleration mechanism 42 | second gearbox 421 |
| second ring gear 422 | second master planet gear 423 | second master planet carrier 424 |
| second sub-planet gear 425 | second sub-planet carrier 426 | connecting shaft 427 |

DETAILED DESCRIPTION OF THE EMBODIMENTS

The term "fitted" within this disclosure is to be interpreted as "attached". Also, the phrase "plane bearing" within this disclosure is to be interpreted as the same as a bearing with the spelling of "plain bearing".

The present invention will now be described in detail in conjunction with the drawings. The drawings are simplified schematic diagrams, and only schematically illustrate the basic structure of the present invention, thus they only show the configurations related to the present invention.

Figure 2:
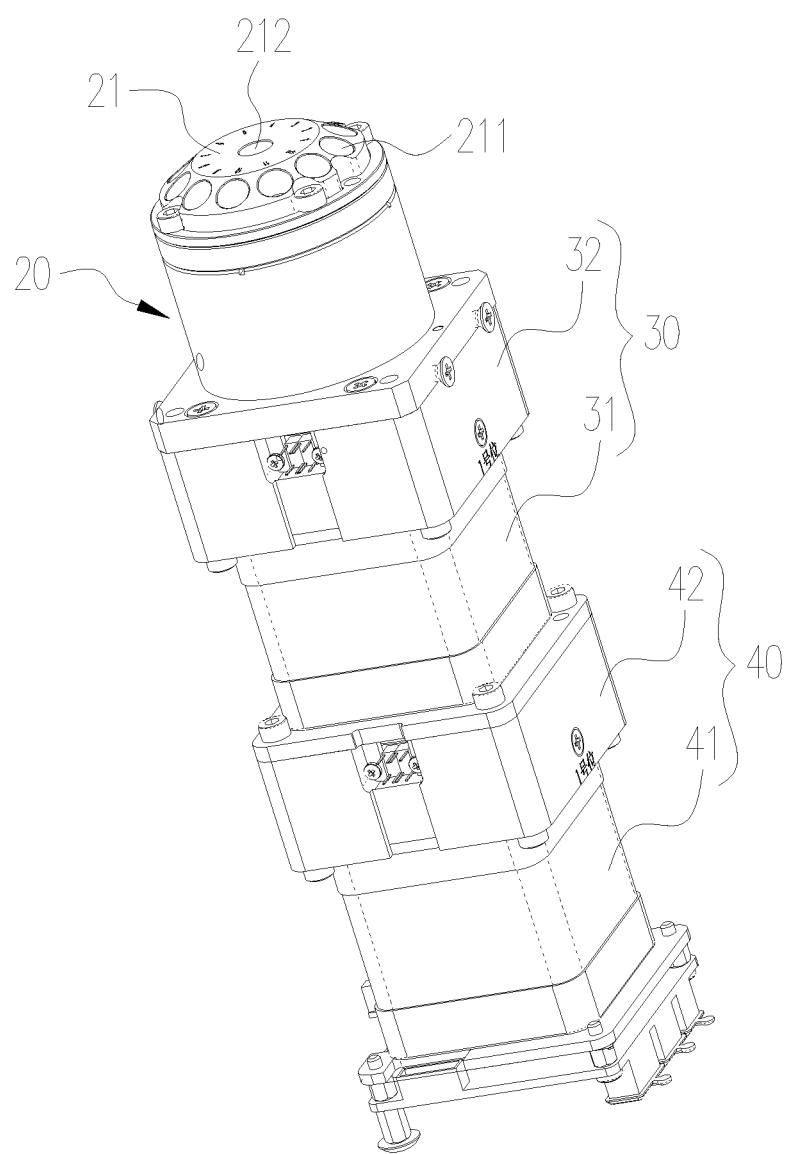
FIG. 2 is another perspective view of the fluid cross-free switching valve shown in FIG. 1 (the housing is omitted)

Referring to FIGS. 1-2, the present invention provides a fluid cross-free switching valve for switching fluid flow channels and controlling fluid flow. The fluid cross-free switching valve includes the housing 10, the valve body 20 mounted on one end of the housing 10, and the first drive assembly 30 and the second drive assembly 40 that are mounted inside the housing 10. The fluid may be liquid or gas, and may also be a gas-liquid mixture, which is not limited herein.

Figure 3:
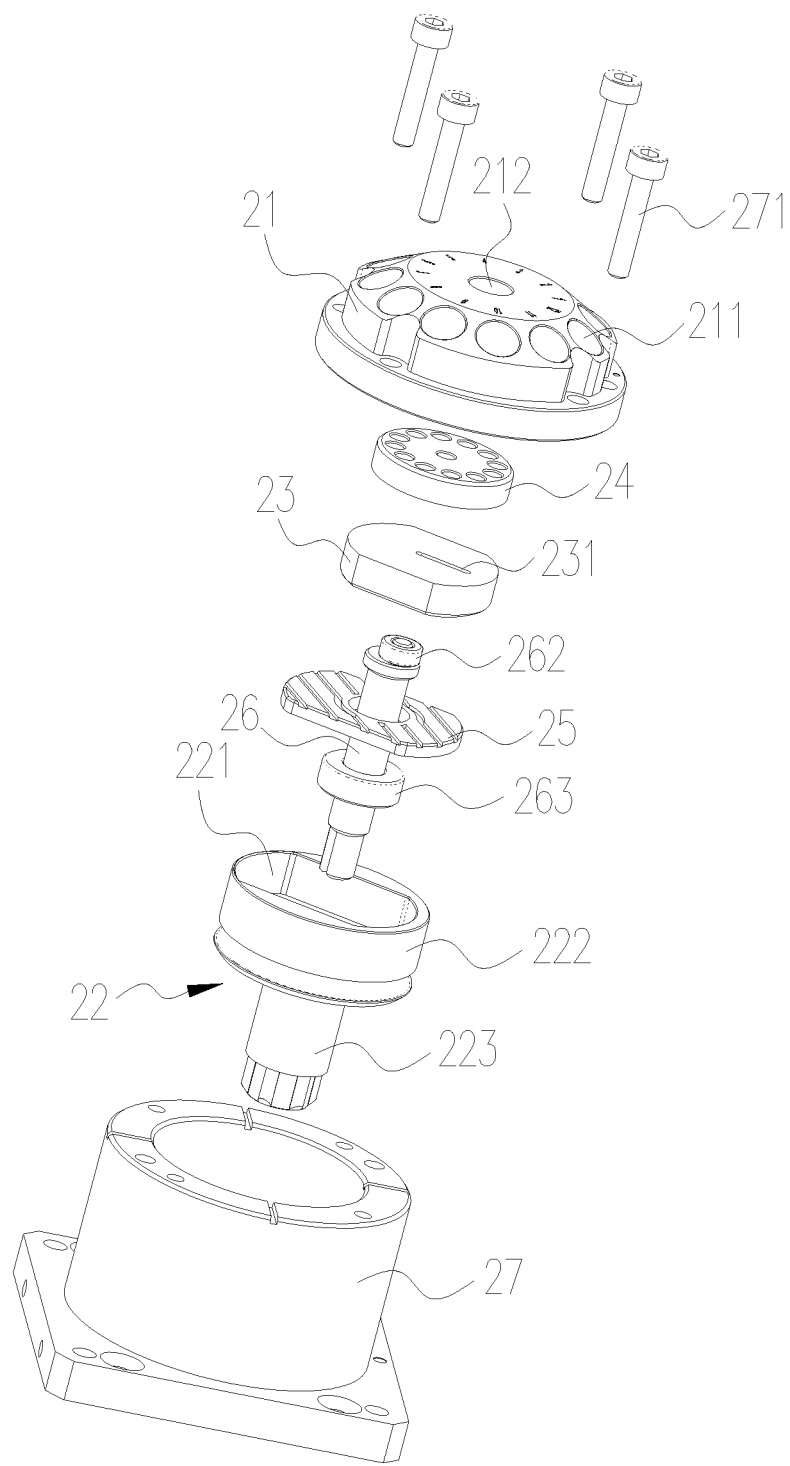
FIG. 3 is a partially exploded view of a valve body in the fluid cross-free switching valve shown in FIG. 1.
Figure 4:
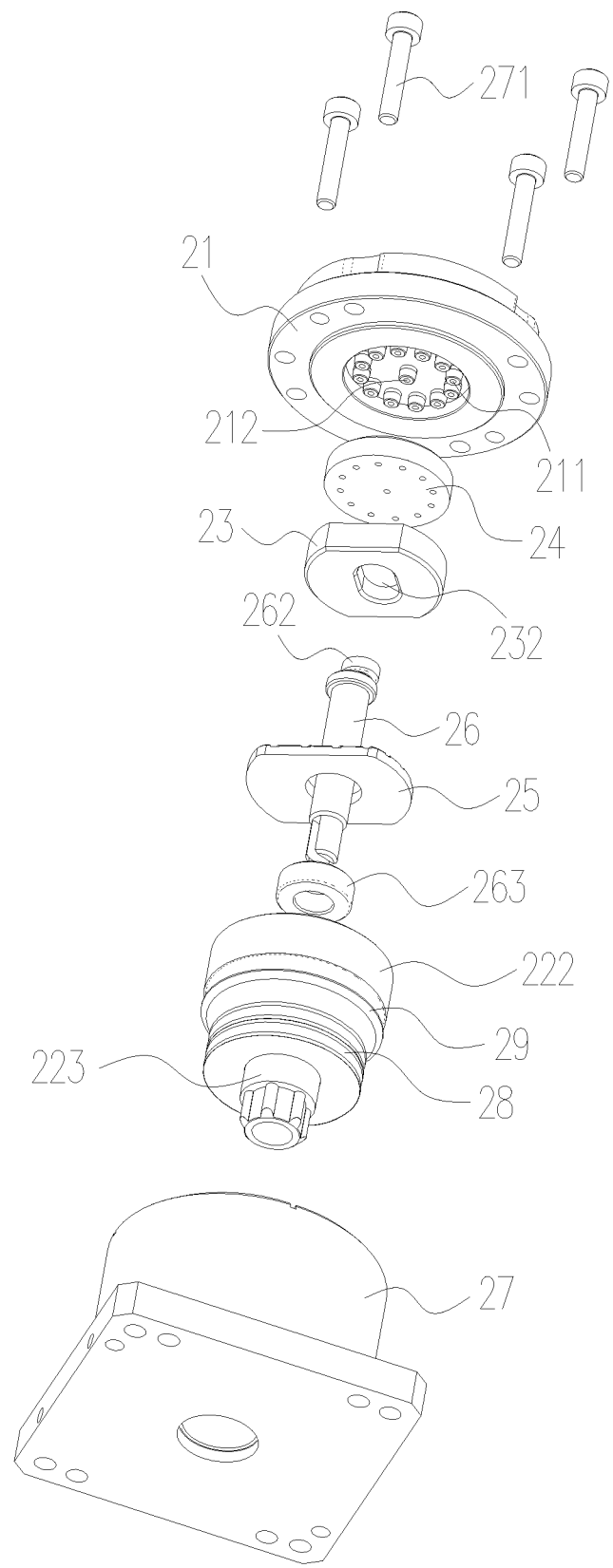
FIG. 4 is a partially exploded view from another perspective of the valve body in the fluid cross-free switching valve shown in FIG. 1.

Referring to FIGS. 3-4, the valve body 20 includes the valve head 21, the valve core seat 22 rotatable relative to the valve head 21, and the rotor valve core 23 slidably mounted on the valve core seat 22. The valve head 21 is provided with a plurality of reversing connectors 211, and the rotor valve core 23 is provided with the groove 231. When in use, rotating the valve core seat 22 relative to the valve head 21 can drive the rotor valve core 23 to rotate together so that the groove 231 is in communication with any reversing connector 211, thereby realizing the function of switching fluid flow channels. Sliding the rotor valve core 23 can change a communication area of the groove 231 and the reversing connector 211, thereby realizing the function of controlling the fluid flow. In this way, the fluid cross-free switching valve may be used in various scientific laboratory, sample testing and other applications.

The valve head 21 has a substantially cylindrical structure. The common connector 212 is provided at the center of the valve head 21 along an axial direction of the valve head 21. A plurality of reversing connectors 211 are evenly distributed on the valve head 21 along a circumference of the valve head 21. Both the reversing connector 211 and the common connector 212 pass through the opposite end surfaces of the valve head 21. An opening of the common connector 212 is equidistant from an opening of each reversing connector 211, wherein the opening of the common connector 212 and the opening of each reversing connector 211 both pass through the end surface, near the valve core seat 22, of the valve head 21. When in use, the fluid flows into the common connector 212, flows through the groove 231 and exits via reversing connector 211. In addition, referring to FIG. 9, each of the reversing connectors 211 is inclined, so an inclined angle α is formed between the central axis of the reversing connector 211 and the central axis of the common connector 212, where $30° \leq \alpha \leq 60°$, in the present embodiment $\alpha=45°$.

The valve core seat 22 has a substantially cylindrical structure. The end surface of the valve core seat 22 near the valve head 21 is provided with the chute 221. The chute 221 has an obround structure, and a length direction of the chute 221 is arranged along a radial direction of the valve core seat 22. The rotor valve core 23 has an obround structure and is matched with the chute 221, and a length of the rotor valve core 23 is smaller than a length of the chute 221 so that the rotor valve core 23 can slide along the length direction of the chute 221 but cannot rotate relative to the valve core seat 22. The groove 231 is provided on the end surface of the rotor valve core 23 near the valve head 21. A length direction of the groove 231 and the length direction of the chute 221 are parallel to each other, and the groove 231 is arranged along the radial direction of the valve core seat 22.

In a specific embodiment, the valve body 20 also includes the stator 24 and the rotor wear-resistant member 25. The stator 24 has a disk-like structure and is detachably fixed to one end of the valve head 21. The rotor valve core 23 and the stator 24 are fitted to form a fitting plane, and the rotor valve core 23 is rotatable relative to the stator 24. The stator 24 is provided with through holes corresponding to the reversing connector 211 and the common connector 212, and the through holes are communicated with the corresponding reversing connector 211 or the common connector 212, i.e., the reversing connector 211 and the common connector 212 both pass through the fitting plane. When in use, the groove 231 communicates with the reversing connector 211 and the common connector 212 through the through holes on the stator 24. The rotor wear-resistant member 25 has an obround structure, and the rotor wear-resistant member 25 is fitted in the chute 221. The rotor valve core 23 is fitted with the rotor wear-resistant member 25, and the rotor valve core 23 is rotatable relative to the rotor wear-resistant member 25. Both the stator 24 and the rotor wear-resistant member 25 are made of a wear-resistant material, which prevents both of them from being seriously worn when the rotor valve core 23 is working, ensures the tightness of the fluid and prevents leakage. In the present embodiment, both the stator 24 and the rotor wear-resistant member 25 are made of sapphire. Since the stator 24 is mounted on the valve head 21, it is only necessary to ensure that the stator 24 has better wear resistance, which can effectively reduce the production cost of the valve head 21. In addition, when the stator 24 is seriously worn, it is only necessary to change the stator 24, which further reduces the production cost. Further, a fitting surface of the stator 24 and the rotor valve core 23 is a plane surface. The plane surface is easier to be machined than a spherical contact surface, and the plane surface can ensure a close fit between the stator 24 and the rotor valve core 23, which prevents fluid leakage during the fluid reversing process.

In addition, the fitting plane between the stator 24 and the rotor valve core 23 is located between two opposite end surfaces of the valve head 21 and the valve core seat 22, that is, a lower end surface of the stator 24 protrudes on a lower end surface of the valve head 21 and an upper end surface of the rotor valve core 23 protrudes on an upper end surface of the valve core seat 22 so that the stator 24 and the rotor valve core 23 are always in contact with each other to ensure sufficient fitting between the stator 24 and the rotor valve core 23. This substantially improves the sealing performance. In other embodiments not shown herein, both the stator 24 and the rotor wear-resistant member 25 may be omitted, in which case both end surfaces of the rotor valve core 23 are fitted with the end surfaces of the valve head 21 and a groove bottom wall of the chute 221, respectively.

Figure 5:
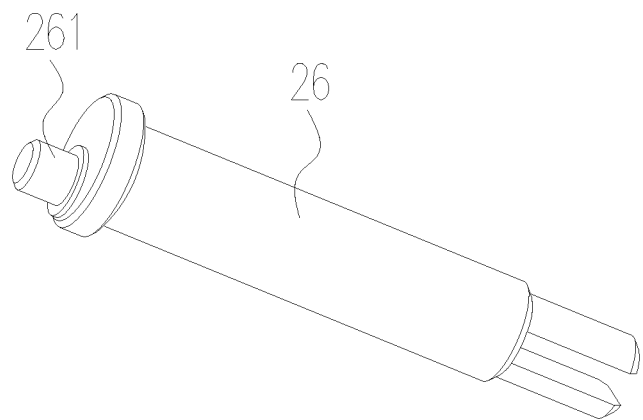
FIG. 5 is a perspective view of a drive shaft in the valve body shown in FIG. 3.
Figure 6:
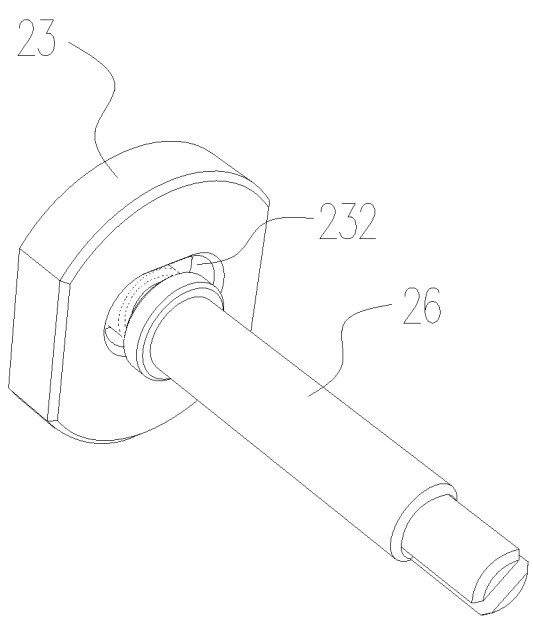
FIG. 6 is a schematic diagram of a connection structure of the drive shaft and a rotor valve core in the valve body shown in FIG. 3.

Referring to FIGS. 5 and 6, in a specific embodiment, the valve body 20 further includes the drive shaft 26. The drive shaft 26 is rotatably inserted in the valve core seat 22. The central axis of the drive shaft 26 is disposed coaxially with the central axis of the valve core seat 22, and one end of the drive shaft 26 extends into the chute 221. Further, the guide groove 232 is provided on the end surface of the rotor valve core 23 away from the valve head 21. The guide groove 232 has an obround structure, and a length direction of the guide groove 232 is perpendicular to the length direction of the chute 221. The connecting strut 261 protrudes at an end part of the drive shaft 26 along the axial direction of the drive shaft 26. A central axis of the connecting strut 261 is staggered from the central axis of the drive shaft 26. The bearing 262 is mounted on the connecting strut 261, and the bearing 262 is movably accommodated in the guide groove 232. The drive shaft 26 and the connecting strut 261 together constitute an eccentric shaft.

In order to ensure smooth rotation of the drive shaft 26 with respect to the valve core seat 22, the valve core bearing 263 is mounted between the drive shaft 26 and the valve core seat 22.

In use, the drive shaft 26 rotates relative to the valve core seat 22 to drive the bearing 262 to rotate around the central axis of the drive shaft 26. When the bearing 262 rotates to contact either of two closer opposite groove walls of the guide groove 232, the bearing 262 pushes the rotor valve core 23 to slide along the length direction of the chute 221, thereby adjusting the radial position of the groove 231. When the valve core seat 22 is rotated, the rotor valve core 23 is driven to rotate together, thereby adjusting a circumferential position of the groove 231.

In the present embodiment, the bearing 262 is mounted on the connecting strut 261. When the rotor valve core 23 slides along the chute 221 under the pushing effect of the bearing 262, an outer ring of the bearing 262 rolls on the groove wall of the guide groove 232, thereby reducing the friction between the connecting strut 261 and the rotor valve core 23 and facilitating the movement of pushing the rotor valve core 23. In other embodiments not shown herein, the bearing 262 may also be omitted, such that the sliding rotor valve core 23 is slid by the pushing the connecting strut 261 against the groove wall of the guide groove 232.

In a specific embodiment, the valve body 20 further includes the valve seat 27 having a substantially sleeve-like structure with two open ends. The valve head 21 is fixedly mounted on one end of the valve seat 27. The valve seat 27 is sleeved on the outside of the valve core seat 22, and the valve core seat 22 is rotatable relative to the valve seat 27. The other end of the valve seat 27 is fixedly connected to the housing 10. The valve head 21 and the valve seat 27 are fixedly connected by the bolt 271. The seal 272 is sandwiched between the outer wall of the valve core seat 22 and the inner wall of the valve seat 27 to improve the sealing performance. The seal 272 is made of a sealing material such as silica gel or rubber and the like.

In a specific embodiment, the valve body 20 further includes the plane bearing 28 and the elastic member 29, both of which are accommodated inside the valve seat 27. Specifically, the valve core seat 22 includes the base 222 and the connecting rod 223 connected to each other. The base 222 and the connecting rod 223 are cylindrical structures, and a diameter of the base 222 is larger than that of the connecting rod 223. The chute 221 is provided on an end surface of the base 222 away from the connecting rod 223. An end surface of the base 222 opposite to the chute 221 forms a contact surface (not shown in the drawings). The plane bearing 28 is sleeved outside the connecting rod 223. The elastic member 29 is telescopically arranged between the plane bearing 28 and the contact surface such that one end of the elastic member 29 elastically contacts the contact surface, and the other end of the elastic member 29 elastically contacts one end surface of the plane bearing 28. The other end surface of the plane bearing 28 contacts the inner wall of one end of the valve seat 27 under the elastic effect of the elastic member 29. When installed in place, the elastic member 29 is compressed, and the elastic force acts on the valve core seat 22, so that the contact surface of the rotor valve core 23 and the stator 24 are closely attached to each other, to further play a sealing role. At the same time, the plane bearing 28 is disposed to ensure that the valve core seat 22 can smoothly rotate relative to the valve seat 27.

In the present embodiment, the elastic member 29 is a belleville spring sleeved outside the connecting rod 223. It will be noted that the elastic member 29 may also be a rigid and elastic element such as a stainless steel spring piece or a copper spring piece, which is not limited here.

In a specific embodiment, there are twelve reversing connectors 211. When the reversing connector 211 currently communicating with the groove 231 is switched to the target reversing connector 211 without crossing other connectors 211 between the above two reversing connectors 211, the rotor valve core 23 first slides to disconnect the groove 231 from the reversing connector 211, and then the valve core seat 22 rotates to make the groove 231 rotate to correspond to the target reversing connector 211, and finally the rotor valve core 23 slides again to communicate the groove 231 with the target reversing connector 211, which realizes a cross-free switching communication and avoids fluid contamination caused by the intersection between the non-target reversing connector 211 and the groove 231 when the reversing connector 211 is switched. In addition, the fluid flow can be controlled by adjusting a sliding distance of the rotor valve core 23 along the chute 221 to control a communication area between the groove 231 and the reversing connector 211. In order to achieve the switching function of the reversing connector 211, there are at least three reversing connectors 211.

In this embodiment, the groove 231 is in communication with only one of the reversing connectors 211 at a time. In other embodiments not shown herein, the groove 231 may also simultaneously communicate with a plurality of reversing connectors 211 at a time, and the plurality of reversing connectors 211 communicating with the groove 231 may be adjacent to each other or separated by other reversing connectors 211. The specific communication situations are determined depending on the shape of the groove 231, which is not limited herein.

Figure 7:
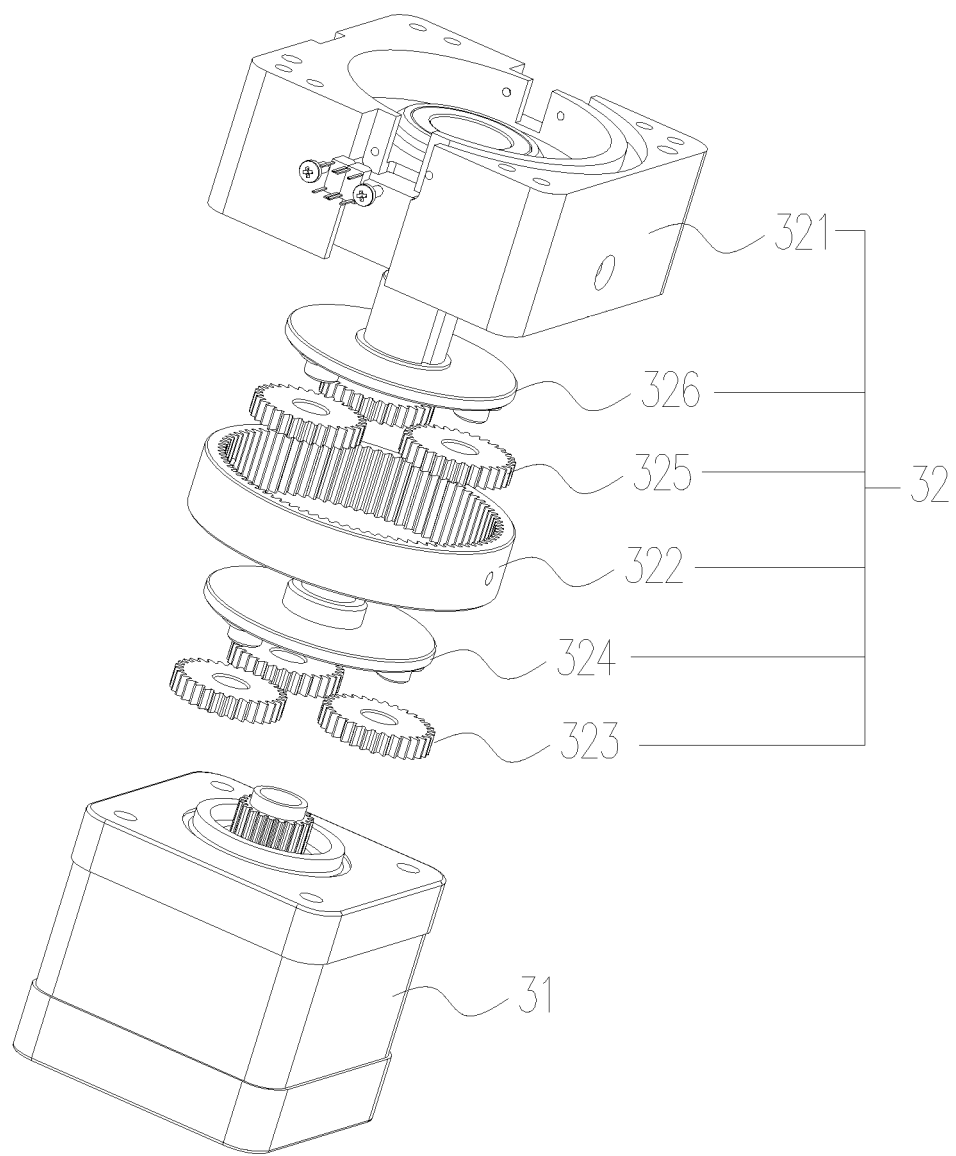
FIG. 7 is an exploded view of a first drive mechanism in the fluid cross-free switching valve shown in FIG. 2.
Figure 8:
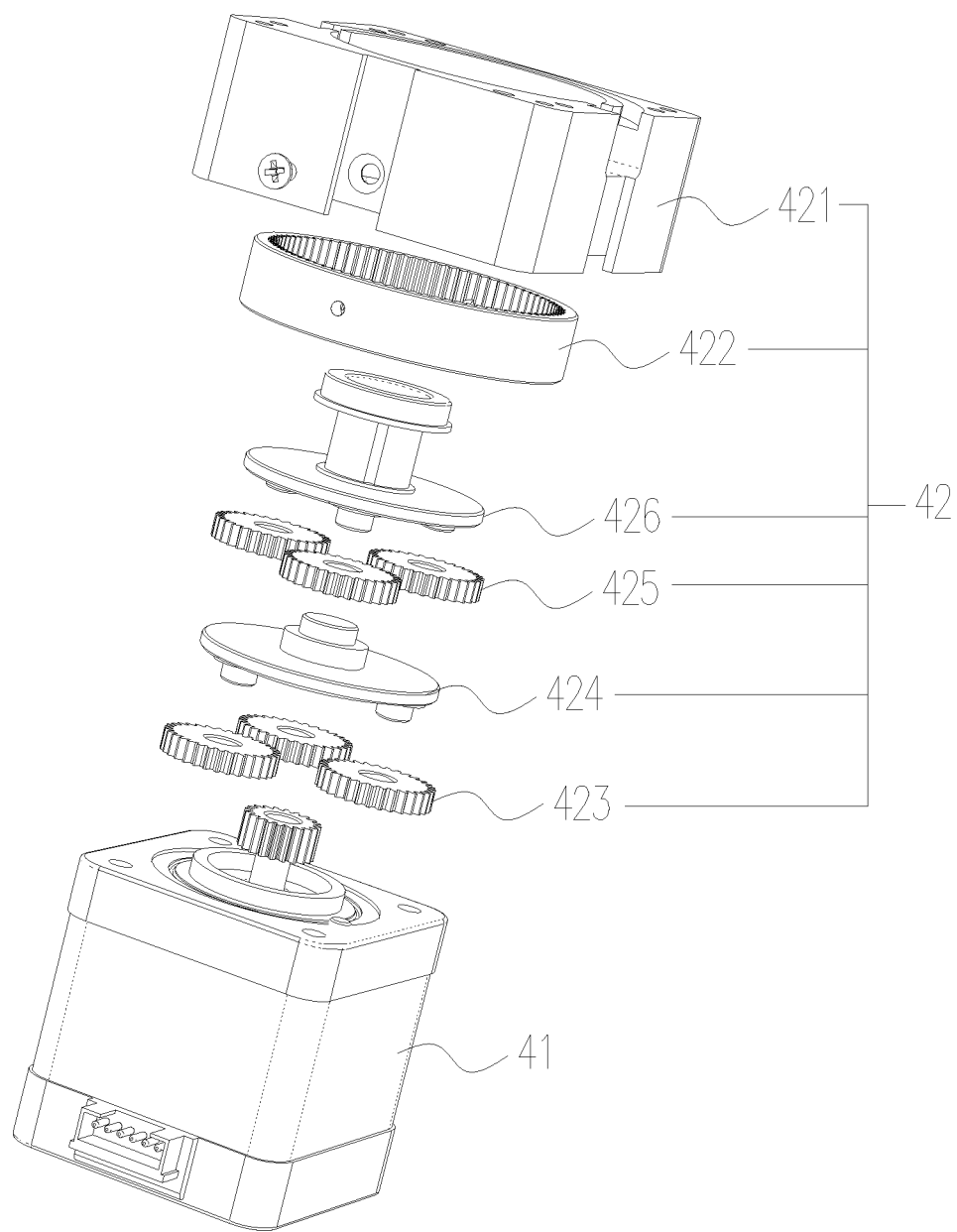
FIG. 8 is a partially exploded view of a second actuating mechanism in the fluid cross-free switching valve shown in FIG. 2 (the connecting shaft is omitted)
Figure 9:
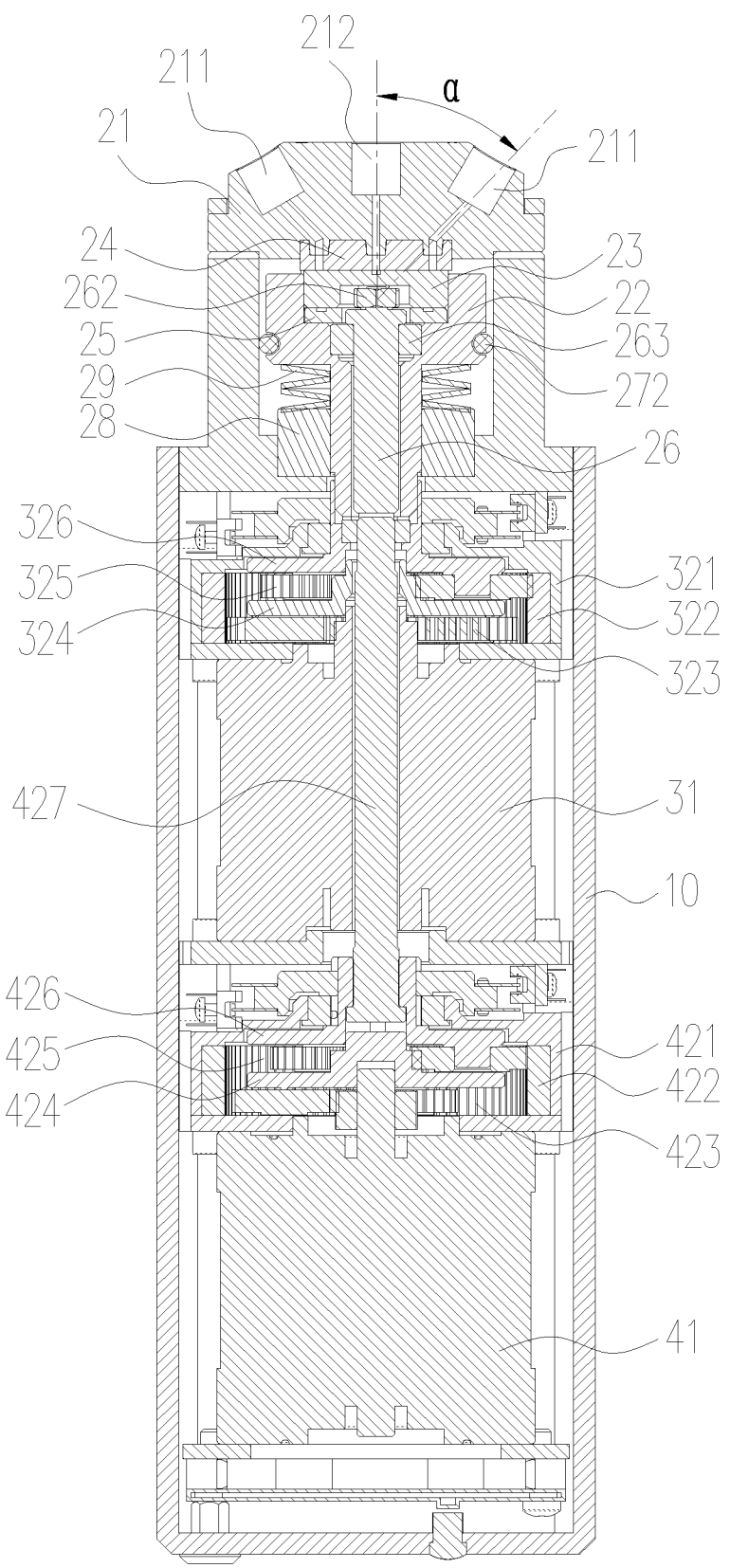
FIG. 9 is a cross-sectional view of the fluid cross-free switching valve shown in FIG. 1.

Referring to FIGS. 7-9, the first drive assembly 30 is configured to drive the valve core seat 22 to rotate relative to the valve head 21, and the second drive assembly 40 is configured to drive the rotor valve core 23 to slide relative to the valve core seat 22.

The first drive assembly 30 includes the first drive motor 31 and the first deceleration mechanism 32. The first deceleration mechanism 32 includes the first gearbox 321, the first ring gear 322, the first master planet gear 323, the first master planet carrier 324, the first sub-planet gear 325 and the first sub-planet carrier 326. The first gearbox 321 is fixedly mounted in the housing 10. The first ring gear 322 is fixedly mounted in the first gearbox 321. The first master planet gear 323 is mounted on the first master planet carrier 324, and the first master planet gear 323 is located between the first ring gear 322 and an output shaft of the first drive motor 31. The first master planet gear 323 is engaged with the first ring gear 322 and a gear sleeved outside the output shaft of the first drive motor 31. The first sub-planet gear 325 is mounted on the first sub-planet carrier 326 and is located between the first ring gear 322 and a central shaft of the first master planet carrier 324. The first sub-planet gear 325 is engaged with the first ring gear 322 and a gear sleeved outside the central shaft of the first master planet carrier 324. The central shaft of the first sub-planet carrier 326 is connected to the valve core seat 22. Specifically, the central shaft of the first sub-planet carrier 326 is sleeved outside the connecting rod 223, and the first sub-planet carrier 326 is slidably embedded and connected to the connecting rod 223, i.e., the first sub-planet carrier 326 can drive the connecting rod 223 to rotate, and the connecting rod 223 can slide in the axial direction of the valve core seat 22 relative to the first sub-planet carrier 326. In this way, when the stator 24 is worn, the valve core seat 22 can move axially under the elastic force of the elastic member 29 such that the stator 24 and the rotor valve core 23 closely fit.

During operation, the first drive motor 31 rotates to drive the first master planet gear 323 to rotate, thereby driving the first master planet carrier 324 to rotate. The first sub-planet gear 325 is driven by the first master planet carrier 324 to rotates, thereby driving the first sub-planet carrier 326 to rotate, and further driving the valve core seat 22 to rotate, which realizes the double reduction gear. It will be appreciated that the first master planet gear 323 serves as a power input of the first drive assembly 30 and the first sub-planet carrier 326 serves as a power output of the first drive assembly 30.

The second drive assembly 40 is located at one side, away from the valve body 20, of the first drive assembly 30. The second drive assembly 40 includes the second drive motor 41 and the second deceleration mechanism 42. The second deceleration mechanism 42 includes the second gearbox 421, the second ring gear 422, the second master planet gear 423, the second master planet carrier 424, the second sub-planet gear 425 and the second sub-planet carrier 426. The second gearbox 421 is fixedly mount in the housing 10. The second ring gear 422 is fixedly mounted in the second gearbox 421. The second master planet gear 423 is mounted on the second master planet carrier 424 and located between the second ring gear 422 and an output shaft of the second drive motor 41. The second master planet gear 423 is engaged with the second ring gear 422 and a gear sleeved outside the output shaft of the second drive motor 41. The second sub-planet gear 425 is mounted on the second sub-planet carrier 426. The second sub-planet gear 425 is engaged with the second ring gear 422 and a gear outside the central shaft of the second master planet carrier 424. The central shaft of the second sub-planet carrier 426 is connected to a connecting shaft 427. The connecting shaft 427 rotatably penetrates the first drive assembly 30 and then is connected to the drive shaft 26. In addition, in order to cooperate with the valve core seat 22 to move axially, the connecting shaft 427 is also slidably embedded and connected to the drive shaft 26, i.e., the connecting shaft 427 can drive the drive shaft 26 to rotate, and the drive shaft 26 can move axially relative to the connecting shaft 427.

During operation, the second drive motor 41 rotates to drive the second master planet gear 423 to rotate, thereby driving the second master planet carrier 424 to rotate. The second sub-planet gear 425 is driven by the second master planet carrier 424 to rotate, thereby driving the second sub-planet carrier 426 to rotate. Further, the drive shaft 26 is driven by the connecting shaft 427 to rotate, finally causing the rotor valve core 23 to slide, which realizes the double reduction gear. The second master planet gear 423 serves as a power input of the second drive assembly 40 and the connecting shaft 427 serves as a power output of the second drive assembly 40.

In other embodiments not shown herein, the first drive assembly 30 that drives the valve core seat 22 to rotate may also be a gear drive assembly. Specifically, the gear drive assembly includes gears arranged at one side of the valve core seat 22 and engaged with the outer peripheral surface of the valve core seat 22. Optionally, the first drive assembly 30 may also be a belt drive assembly including a belt. The belt is sleeved outside the valve core seat 22 for driving the valve core seat 22 to rotate. In addition, the second drive assembly 40 for driving the rotor valve core 23 to slide may also be realized by means of a cylinder, in particular, the cylinder is mounted on the valve core seat 22, and the rotor valve core 23 is connected to a protruding end of the cylinder, such that the reciprocation of the cylinder drives the rotor valve core 23 to slide.

The fluid cross-free switching valve provided by the invention can realize the switching function of fluid flow channels by rotating the valve core seat 22 relative to the valve head 21, and can realize the function of controlling fluid flow by sliding the rotor valve core 23 relative to the valve core seat 22. The valve core seat 22 and the rotor valve core 23 can jointly operate to realize the cross-free switching and communication function. The fluid cross-free switching valve has a compact structure, and can avoid fluid cross-contamination.

Inspired by the above preferred embodiments and descriptions according to the present invention, a person skilled in the art can make various changes and modifications within the scope of the present invention. The technical scope of the present invention is not limited to the contents of the description, but must be determined according to the scope of the claims.

What is claimed is:

1. A fluid cross-free switching valve, comprising a valve body, a first drive assembly and a second drive assembly, wherein
the valve body comprises a valve head, a valve core seat and a rotor valve core, wherein
the valve core seat is rotatable relative to the valve head,
the rotor valve core is slidably mounted on the valve core seat,
the rotor valve core is attached to the valve head,
the valve head is provided with at least three reversing connectors, the rotor valve core is provided with a groove, and
the groove is in communication with the reversing connector; and
the first drive assembly is configured to drive the valve core seat to rotate, and the second drive assembly is configured to drive the rotor valve core to slide.

2. The fluid cross-free switching valve of claim 1, wherein
the valve core seat is provided with a chute,
the rotor valve core is slidably connected to the chute,
an end surface, away from the valve head, of the rotor valve core is provided with a guide groove,
a length direction of the guide groove is perpendicular to a length direction of the chute, and
the valve body further comprises an eccentric shaft, wherein the eccentric shaft is rotatably inserted into the valve core seat, and an end of the eccentric shaft is movably accommodated in the guide groove.

3. The fluid cross-free switching valve of claim 2, wherein the eccentric shaft comprises a drive shaft and a connecting strut, wherein
the connecting strut protrudes at an end portion of the drive shaft,
a central axis of the connecting strut is staggered from a central axis of the drive shaft,
a bearing is mounted on the connecting strut, and the bearing is accommodated in the guide groove.

4. The fluid cross-free switching valve of claim 2, wherein
the length direction of the chute is arranged along a radial direction of the valve core seat,
a length direction of the groove is parallel to the length direction of the chute, and
the groove is arranged along the radial direction of the valve core seat.

5. The fluid cross-free switching valve of claim 2, wherein the valve body further comprises a rotor wear-resistant member, wherein
the rotor wear-resistant member is matched with the chute,
the rotor wear-resistant member is mounted in the chute, and
the rotor valve core is attached to the rotor wear-resistant member.

6. The fluid cross-free switching valve of claim 2, wherein the valve body further comprises a valve seat, wherein
the valve head is mounted on a first end of the valve seat,
the valve seat is sleeved outside the valve core seat, and
the valve core seat is rotatable relative to the valve seat.

7. The fluid cross-free switching valve of claim 6, wherein the valve body further comprises a plane bearing and an elastic member, wherein
a contact surface is formed on the valve core seat,
the plane bearing is sleeved outside the valve core seat,
the elastic member is telescopically arranged between the plane bearing and the contact surface, and
an end surface of the plane bearing contacts an inner wall of a second end of the valve seat.

8. The fluid cross-free switching valve of claim 2, wherein the rotary valve further comprises a housing, wherein the valve body is mounted on an end of the housing, and both the first drive assembly and the second drive assembly are mounted in the housing.

9. The fluid cross-free switching valve of claim 8, wherein
the first drive assembly comprises a first drive motor and a first deceleration mechanism, wherein
the first drive motor is connected to a power input end of the first deceleration mechanism, and
a power output end of the first deceleration mechanism is connected to the valve core seat; and
the second drive assembly comprises a second drive motor and a second deceleration mechanism, wherein
the second drive motor is connected to a power output end of the second deceleration mechanism, and
the power output end of the second deceleration mechanism is connected to the eccentric shaft after rotatably passing through the first drive assembly.

10. The fluid cross-free switching valve of claim 1, wherein
the at least three reversing connectors are evenly distributed along a circumference of the valve head,
a center of the valve head is provided with a common connector for inflowing fluid along an axial direction of the valve head, and
the common connector is in communication with the groove.

* * * * *